Patented Apr. 29, 1930  1,756,248

UNITED STATES PATENT OFFICE

HENRY JORDAN, OF WILMINGTON, DELAWARE, ASSIGNOR TO E. I. DU PONT DE NEMOURS & COMPANY, OF WILMINGTON, DELAWARE, A CORPORATION OF DELAWARE

AZO DYE AND PROCESS OF MAKING THE SAME

No Drawing.    Application filed February 3, 1927. Serial No. 165,759.

This invention relates to azo dyes and the process of their production. More particularly, it relates to dyes having the following general formula:

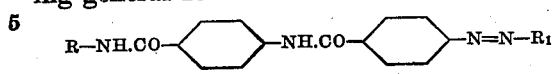

where R is a substituted or unsubstituted aromatic radical without a hydroxyl group and $R_1$ is any radical adapted to be coupled with the diazo group to give a dye.

It is well known that monoazo dyes in general have no affinity for vegetable fibre. A primary object of this invention is the production of monoazo dyes having a marked affinity for cotton. Another object is to provide dyes of this type having exceptionally good fastness to light.

It has been found that when compounds of the general formula

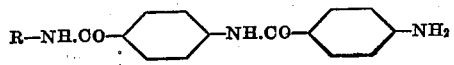

are diazotized and coupled to a second component, dyes of the desired properties will be obtained.

In order to better disclose the invention, several specific embodiments thereof are furnished below. It is to be understood that these examples are purely illustrative:

Example 1

433 parts of the sodium salt of p-amino-benzoyl-p-amino-benzoyl-p-sulphanilic acid

(which has been obtained by condensing p-sulphanilic acid with p-nitro-benzoyl chloride, reducing the nitro-benzoyl compound, condensing the amino-benzoyl compound with another molecule of p-nitro-benzoyl chloride and reducing the nitro body again) are stirred up with 10,000 parts of water, heated up to 60-65° C., acidified with 260 parts of a 31% hydrochloric acid solution, and diazotized at 60-65° C. with 69 parts of sodium nitrite. The diazotization of this compound will go to completeness only at this unusual high temperature. The diazo compound is very stable, even at a higher temperature and against alkali. The diazo compound is coupled to 254 parts of p-sulpho-phenyl-methyl-pyrazolone dissolved in 400 parts of water and 250 parts of sodium carbonate. The coupling is completed by heating the mass up to 70° C. The dye is then salted out and filtered. In its dry ground form it is a yellowish powder, soluble in water with a bright greenish-yellow color. It dyes cotton in bright greenish-yellow shades, which have an exceptional good fastness to light. Wool and silk are likewise dyed in bright yellowish shades. The new dye has most probably the following formula:

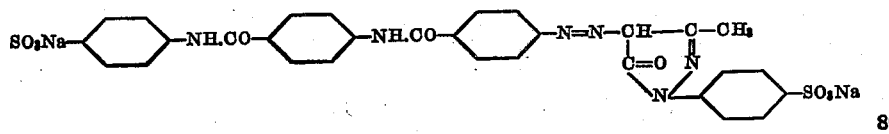

If m-amino-phenyl-methyl-pyrazolone is used as a coupling component, a dye of similar properties will be obtained. But this dye, having a free amino group, may be diazotized and developed on the fiber, the developed dyeings showing a very good fastness to washing. Beta-napthol will give a bright orange; pyrazolone a bright yellow, similar in shade to the direct dyeing, but much stronger and of a much better fastness to washing.

Other coupling components may be used. 1-naphthol-4-sulphonic acid will give a bright yellowish scarlet; acetyl H-acid a bright reddish-violet; gamma acid a brown. All dyeings show a very good fastness to light.

Example 2

585 parts of the disodium salt of p-amino-benzoyl-p-amino-benzoyl-2-naphthylamine-6:8-disulphonic acid.

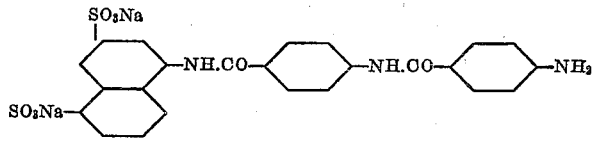

(obtained in a similar way as described for the p-sulphanilic acid) are diazotized in the same way as shown in Example 1 for the p-amino-benzoyl-p-amino-benzoyl-p-sulphanilic acid. The diazo compound is coupled to 174 parts of phenyl-methyl-pyrazolone, dissolved in 4,000 parts of water and 250 parts of sodium carbonate. The dye is finished and salted in a similar way as described in Example 1. In its dry ground form it is a yellowish powder, soluble in water with a bright greenish-yellow color. It dyes the vegetable and animal fibers in greenish-yellow shades which show an exceptional good fastness to light. The new dye has most probably the following formula:

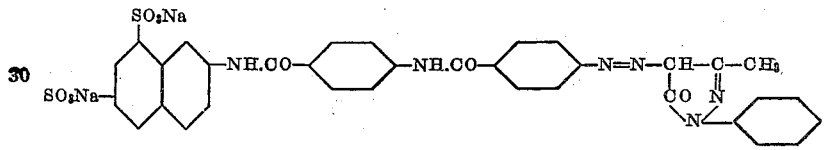

Other coupling components may be used and various shades are thus obtained. Beta-naphthol will yield a bright orange; Schaeffer's salt gives an orange; gamma acid a brown; 1-amino-8-naphthol-4-sulphonic acid a bluish-violet; acetyl-1-amino-8-naphthol-4-sulphonic acid a reddish-violet. All dyeings are very fast to light.

Other p-amino-benzoyl-p-amino-benzoyl-amino aryl compounds may of course be used, as p-amino-benzoyl-p-amino-benzoyl-metanilic acid, amino-benzoyl-amino-benzoyl-2-naphthylamine-4-8-disulphonic acid and amino-benzoyl-amino-benzoyl-1-naphthylamine-4-sulphonic acid, the shades of the dyes, however, being mainly dependent on the coupling components, whereas the diazo compound has not much influence on the shade, but on the solubility of the dye.

Any azo coupling component may be employed, for example, in addition to those mentioned above, may be mentioned aceto-acetic-ester; aceto-acetanilide and its derivatives, phenols, phenol sulfonic acids, naphthols and amino naphthols and their sulphonic acids and amino benzenes and amino naphthalenes which have a free para position.

I claim:

1. A dye having affinity for vegetable fibre and containing the following group

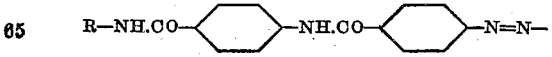

where R is a substituted or unsubstituted aromatic radical without a hydroxyl group attached to the nucleus.

2. A dye having affinity for vegetable fibre and having the following general formula

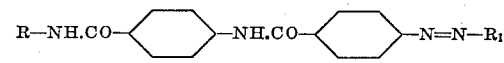

where R is a substituted or unsubstituted aromatic radical without a hydroxyl group attached to the nucleus and $R_1$ is any radical adapted to be coupled with the diazo group.

3. The dye set forth in claim 1 wherein R is a radical including the configuration

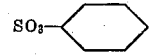

4. The dye set forth in claim 1 wherein R contains a naphthyl sulphonic acid group.

5. The dye set forth in claim 1 wherein R contains a naphthyl di-sulphonic acid group.

6. The dye set forth in claim 2 wherein $R_1$ contains a heterocyclic group.

7. The dye set forth in claim 2 wherein $R_1$ contains the group

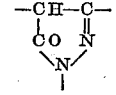

8. The dye set forth in claim 2 wherein $R_1$ contains a phenyl-methyl-pyrazolone group.

9. The dye set forth in claim 2 wherein $R_1$ contains an amino-phenyl-methyl pyrazolone group.

10. The dye set forth in claim 2 wherein $R_1$ contains a diazotizable amino group.

11. The process of preparing an azo dye which comprises diazotizing a compound having the general formula

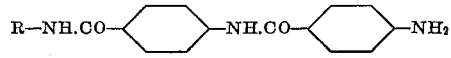

where R is a substituted or unsubstituted aromatic radical without a hydroxyl group attached to the nucleus and coupling the diazo compound to an azo coupling component.

12. The process set forth in claim 11 wherein R is a radical including the configuration

13. The process set forth in claim 11 wherein R contains a naphthyl sulphonic acid group.

14. The process set forth in claim 11 wherein the azo component contains the group

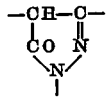

15. The process set forth in claim 11 wherein the azo coupling component contains a phenyl-methyl-pyrazolone group.

16. The process set forth in claim 11 wherein the azo coupling component contains a diazotizable amino group.

17. Vegetable fibre dyed with the dye set forth in claim 1.

In testimony whereof I affix my signature.

HENRY JORDAN.